US008880963B2

(12) United States Patent
Nobata

(10) Patent No.: US 8,880,963 B2
(45) Date of Patent: Nov. 4, 2014

(54) MESSAGE PROCESSING DEVICE AND METHOD THEREOF

(75) Inventor: Hideaki Nobata, Tokyo (JP)

(73) Assignee: Hewlett-Packard Development Company, L. P., Houston, TX (US)

( * ) Notice: Subject to any disclaimer, the term of this patent is extended or adjusted under 35 U.S.C. 154(b) by 1739 days.

(21) Appl. No.: 12/065,664

(22) PCT Filed: Sep. 6, 2005

(86) PCT No.: PCT/JP2005/016284
§ 371 (c)(1),
(2), (4) Date: Mar. 4, 2008

(87) PCT Pub. No.: WO2007/029308
PCT Pub. Date: Mar. 15, 2007

(65) Prior Publication Data
US 2009/0271666 A1    Oct. 29, 2009

(51) Int. Cl.
G06F 11/00   (2006.01)
G06F 9/54    (2006.01)
G06F 9/50    (2006.01)
H04L 12/58   (2006.01)
G06F 11/34   (2006.01)

(52) U.S. Cl.
CPC .......... G06F 9/544 (2013.01); G06F 11/3466 (2013.01); G06F 9/546 (2013.01); G06F 9/5016 (2013.01); H04L 12/58 (2013.01)
USPC .............. 714/49; 714/54; 710/56; 711/159; 711/170; 707/642

(58) Field of Classification Search
None
See application file for complete search history.

(56) References Cited

U.S. PATENT DOCUMENTS

| 6,275,569 B1 * | 8/2001 | Cannon ................ 379/88.01 |
| 2002/0026566 A1 * | 2/2002 | Awada et al. ............ 711/162 |
| 2004/0062365 A1 * | 4/2004 | Agraharam et al. ....... 379/88.14 |
| 2005/0255837 A1 * | 11/2005 | Kwon .................. 455/414.4 |

FOREIGN PATENT DOCUMENTS

| JP | 9-171494 | 6/1997 |
| JP | 10-190778 | 7/1998 |
| JP | 2000-78243 | 3/2000 |
| JP | 2001-36563 | 2/2001 |

OTHER PUBLICATIONS http://java.sun/docs/books/jvms/second-edition/html/Introduction.doc.html#3057 downloaded Mar. 3, 2008.

(Continued)

Primary Examiner — Christopher McCarthy

(57) ABSTRACT

There are provided a message processing device and a method improved to store a plenty of messages used for processing. When a message is transmitted to another node for providing a service, a message processing unit (26) monitors the message transferred and stores it in a storage region whose allocation is released when the remaining memory amount has become little. When an error has occurred in the processing of a service providing unit (200), the message processing unit (26) stores the error type and a session identifier associated with it. When a message transmission is requested from outside and the error type, the session identifier, and a message associated with them are stored, the message processing unit (26) transmits them. If the storage region which was containing a message is released and no message exists, the message processing unit (26) transmits the other two items.

11 Claims, 9 Drawing Sheets

(56) References Cited

OTHER PUBLICATIONS http://java.sun.com/javase/6/docs/api/java/lang/ref/SoftReference.html, downlaoded Mar. 3, 2008.

International Search Report, Japanese Patent Office, International Application No. PCT/JP2005/016284, Dec. 20, 2005.

* cited by examiner

NETWORK SYSTEM 1

102~108.2

CLIENT PROGRAM 14

MANAGEMENT PROGRAM 16

(A)

(B)

MESSAGE PROCESSING DEVICE AND METHOD THEREOF

PRIORITY CLAIM

The present invention claims priority under 35 U.S.C. 119 to Japanese PCT Application Serial No. PCT/JP2005/016284, filed on Sep. 6, 2005, the disclosure of which is hereby incorporated by reference in its entirety.

TECHNICAL FIELD

The present invention relates to a message processing device which processes messages transmitted between communication nodes and a method thereof.

BACKGROUND ART

In network systems where data for various types of processing (hereinafter, also referred to as message) is transmitted among many communication nodes, desirably all of messages transmitted are stored for analysis of the cause of a communication error. Storing all messages is difficult because, while numerous messages are transmitted in such systems, memories in the communication nodes have a limited capacity.

Japan Patent JP 10-190778 A, for example, discloses a method of logging communication errors. However, this method updates the communication error log by overwriting, and no record of the fact that there has been a communication error remains when the communication error log is overwritten after a lapse of some time.

The website, http://e-words.jp/, for example, discloses a Java (Registered Trademark) virtual machine. Memory management of this Java virtual machine allows one allocating a storage area to set whether to free up the storage area when the remaining memory capacity becomes small.

SUMMARY

Problem to be Solved by the Invention

The present invention has been made in view of the background described above, and an object of the present invention is therefore to provide a message processing device and method improved to store as many messages that have been used for processing as possible.

Another object of the present invention is to provide a message processing device and method improved to save a record of a fact that an error has occurred after a record of a message which is used for error analysis or the like is updated due to memory capacity shortage.

Means for Solving the Problems

In order to attain the above-mentioned objects, according to the present invention, there is provided a message processing device, including: a first processing means which performs first processing of storing a transmitted message in a first storage area allocated to a memory; a second processing means which performs second processing using both or one of the first storage area of the memory and a second storage area of the memory, the second processing being other processing than the first processing, the second storage area being other areas than the first storage area; a remaining capacity monitoring means which monitors a remaining capacity of the memory, the remaining capacity being what is left after excluding the first storage area and the second storage area; a freeing up means which deallocates the first storage area from the memory depending on the remaining capacity of the memory; and a message outputting means which outputs, in response to a request, the message stored in the first storage area of the memory.

Preferably, the message processing device further includes an error detecting means which detects at least an error that occurs in the second processing, in which the message outputting means outputs a message relevant to the detected error.

Preferably, the freeing up means deallocates the first storage area from the memory when the remaining capacity of the memory is equal to or smaller than a given amount.

Preferably, when the first storage area is allocated to the memory and the allocated first storage area is storing a message, the message outputting means outputs at least the stored message, and, when the first storage area allocated to the memory is freed up and a message has been stored in the freed up first storage area, the message outputting means outputs at least first information indicating the fact that a message has been stored.

Preferably, when the first storage area is allocated to the memory and the allocated first storage area is storing a message, the message outputting means outputs the stored message and the first information.

Preferably, the second processing includes third processing that the message processing device is requested to perform by an external, and a message transmitted between the external and the message processing device is data that is used for the third processing.

Further, according to the present invention, there is provided a message processing system including a first node and a second node between which a message is transmitted, in which the second node includes: a first processing means which performs first processing in which the message transmitted between the first node and the second node is stored in a first storage area allocated to a memory; a second processing means which performs second processing using both or one of the first storage area of the memory and a second storage area of the memory, the second processing being other processing than the first processing, the second storage area being other areas than the first storage area; a remaining capacity monitoring means which monitors a remaining capacity of the memory, the remaining capacity being what is left after excluding the first storage area and the second storage area; a freeing up means which deallocates the first storage area from the memory depending on the remaining capacity of the memory; and a message outputting means which outputs, in response to a request, the message stored in the first storage area of the memory.

Further, according to the present invention, there is provided a message processing method, including: a first processing step which performs first processing of storing a transmitted message in a first storage area allocated to a memory; a second processing step which performs second processing using both or one of the first storage area of the memory and a second storage area of the memory, the second processing being other processing than the first processing, the second storage area being other areas than the first storage area; a remaining capacity monitoring step which monitors a remaining capacity of the memory, the remaining capacity being what is left after excluding the first storage area and the second storage area; a freeing up step which deallocates the first storage area from the memory depending on the remaining capacity of the memory; and a message outputting step which outputs, in response to a request, the message stored in the first storage area of the memory.

Further, according to the present invention, there is provided a program which causes a computer to execute: a first processing step which performs first processing of storing a transmitted message in a first storage area allocated to a memory; a second processing step which performs second processing using both or one of the first storage area of the memory and a second storage area of the memory, the second processing being other processing than the first processing, the second storage area being other areas than the first storage area; a remaining capacity monitoring step which monitors a remaining capacity of the memory, the remaining capacity being what is left after excluding the first storage area and the second storage area; a freeing up step which deallocates the first storage area from the memory depending on the remaining capacity of the memory; and a message outputting step which outputs, in response to a request, the message stored in the first storage area of the memory.

Effect of the Invention

With a message processing device and method according to the present invention, as many messages that have been used for processing as possible can be stored. A message processing device and method according to the present invention also ensure that a record of a fact that an error has occurred is saved after an update of a record of a message which is used for error analysis or the like due to memory capacity shortage.

DETAILED DESCRIPTION

Best Mode for Carrying Out the Invention

An embodiment of the present invention will be described below.

Network System 1

Figure 1:
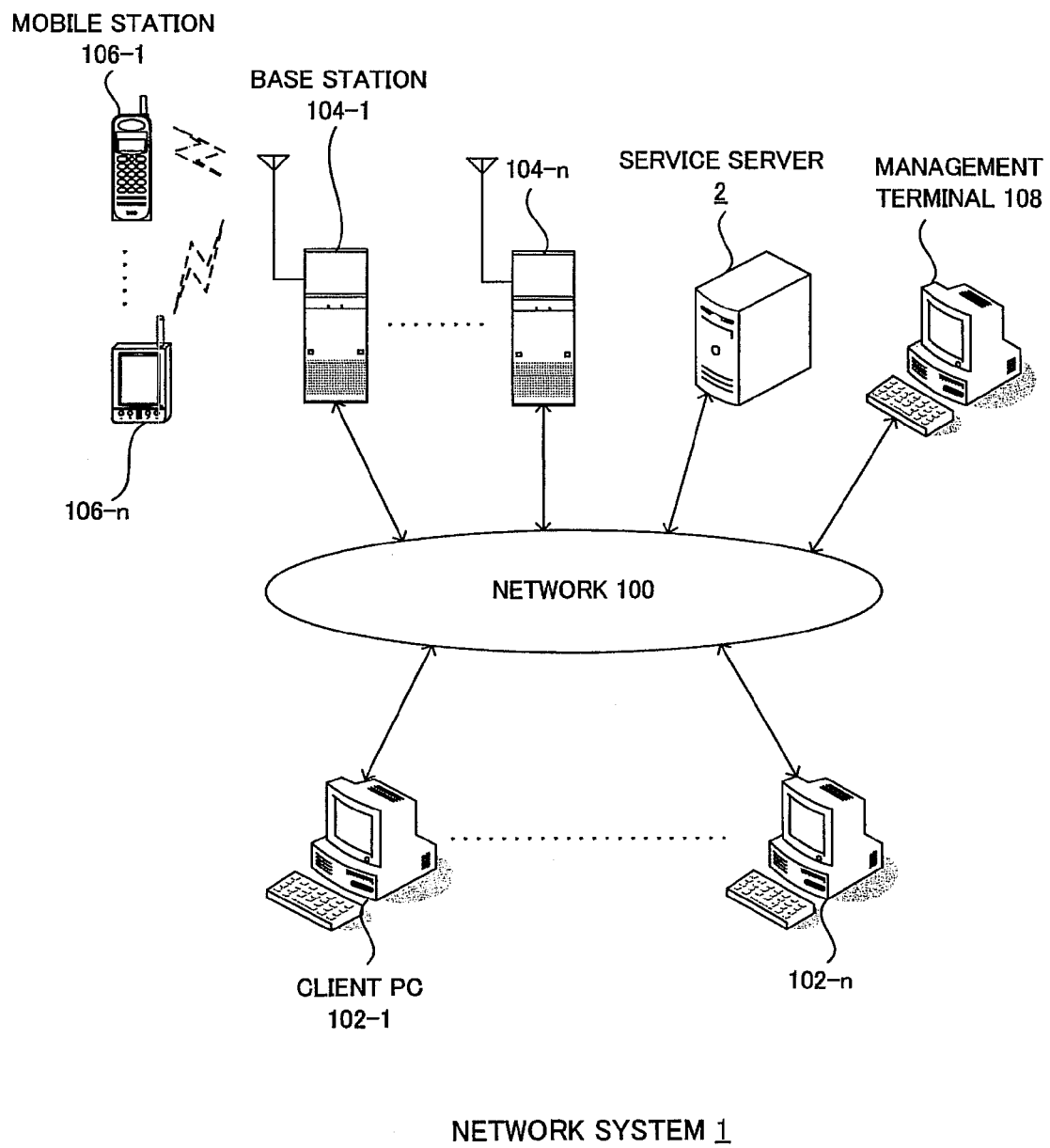
FIG. 1 is a diagram showing an example of the configuration of a network system to which message processing according to the present invention is applied.

FIG. 1 is a diagram showing an example of the configuration of a network system 1 to which message processing according to the present invention is applied.

As shown in FIG. 1, the network system 1 is structured by connecting client computers (client PCs) 102-1 to 102-n, base stations 104-1 to 104-n and mobile stations 106-1 to 106-n, which are for mobile communication, a management terminal 108, and a service server 2, in a manner that enables them to communicate with one another via a network 100.

"n" is an integer equal to or larger than 1, and is not always the same number. Any unspecified one of the client PCs 102-1 to 102-n may simply be referred to as client PC 102, and the same applies to other multiple components. The client PC 102 and other components that can be main components to initiate communication and perform information processing in the network system 1 may collectively be referred to as nodes. Figures to which references are made in the following employ the same symbols for substantially identical components.

In the network system 1 having these components, the client PC 102 and the mobile station 106 request from the service server 2 for various services and the service server 2 provides the client PC 102 and the mobile station 106 with the requested services. To enable the service server 2 to provide the client PC 102 and the mobile station 106 with services, the service server 2 in the network system 1 stores as much data transmitted therebetween (also referred to as messages) as the memory capacity of the service server 2 allows. The stored messages are provided for analysis of a processing error in the service server 2, or the like. When the remaining memory capacity of the service server 2 becomes small, information indicating that a processing error has occurred in the service server 2 is stored and provided instead.

Services provided by the service server 2 are ones that are used by an unspecified number of users of the client PCs 102 and the mobile stations 106 and accordingly can cause the processing load on the service server 2 to greatly fluctuate with time, for example, ticket reservation via the network 100 and a prize program for promotion of merchandise.

Hardware

Described below is hardware of the nodes in the network system 1.

Figure 2:
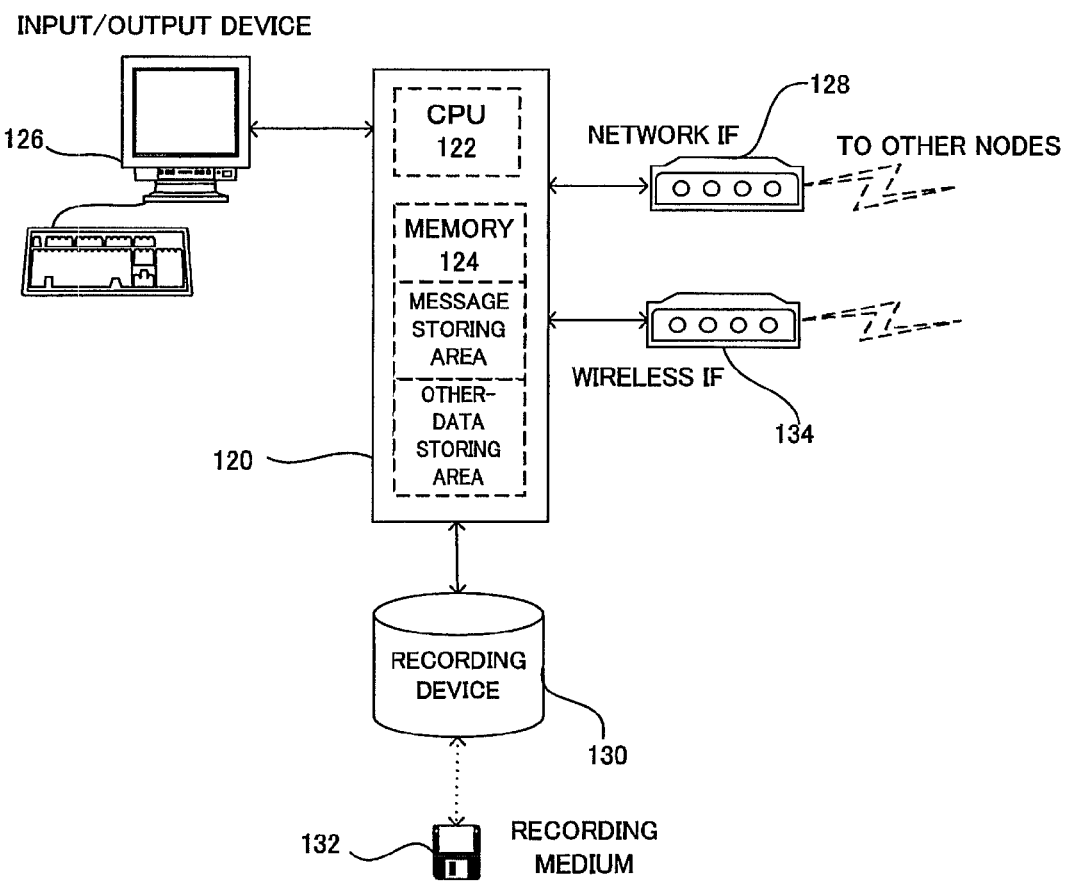
FIG. 2 is a diagram showing an example of the hardware configuration of a client PC, base station, mobile station, and management terminal shown in FIG. 1.

FIG. 2 is a diagram showing an example of the hardware configuration of the client PC 102, base station 104, mobile station 106, and management terminal 108 shown in FIG. 1. As illustrated in FIG. 2, these nodes are each composed of a main body 120 which contains a CPU 122, a memory 124, and others, an input/output device 126 which includes a display, a keyboard, and the like, a network interface (network IF) 128 which is used for communication with the network 100, and a recording device 130 which is an HDD, CD, or a non-volatile memory.

The base station 104 and the mobile station 106 have an additional component, a wireless IF 134, which is used for communication therebetween. In short, each node in the network system 1 has the components of a computer that is capable of information processing and communication with another node.

Software

Described below is software of the respective nodes in the network system 1.

Figure 3:
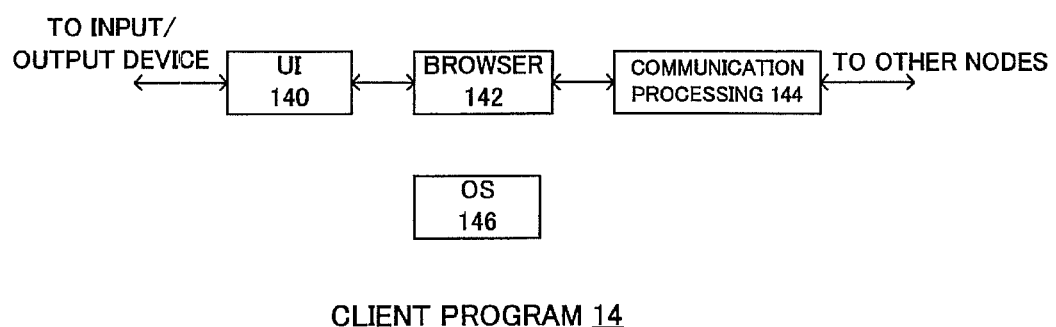
FIG. 3 is a diagram showing the configuration of a client program which is run on the client PC and mobile station shown in FIG. 1 and FIG. 2.

FIG. 3 is a diagram showing the configuration of a client program 14 which is run on the client PC 102 and mobile station 106 shown in FIG. 1 and FIG. 2. As illustrated in FIG. 3, the client program 14 is composed of a user interface (UI) module 140, a browser 142, and a communication processing module 144.

An operating system (OS) 146 is installed in the client PC 102 and the mobile station 106 to hide the hardware of these nodes and provide the hardware for the execution of a program. The client program 14 is supplied to the client PC 102 and the mobile station 106 via a recording medium 132 or the network 100, loaded onto the memory 124 (FIG. 2), and run on the OS 146 by utilizing the hardware of these nodes in a specific manner (the same applies to the following programs). With these components, the client program 14 requests the service server 2 to provide a service to the client PC 102, and outputs to the user a processing result of the service which is sent in response to the request.

The UI module 140 controls processing of the respective components of the client program 14 according to the user's operation of the input/output device 126 of the client PC 102 or of the mobile station 106 which is made to request a service or for other purposes. The UI module 140 also outputs to the browser 124 data that indicates what operation has been made.

The UI module 140 outputs data such as a service processing result which is input by the browser 142 to the user by, for example, displaying the data on the input/output device 126. The browser 142 is, for example, a Web browser. The browser 142 does requesting a service from the service server 2, displaying a service result from the service server 2 to the user, and the like.

The communication processing module 144 performs processing necessary for inter-node communication, such as authentication between the client PC 102 and the service server 2 and between the mobile station 106 and the service server 2, and session management. As the need arises, the communication processing module 144 provides data, such as the identifier of a session held for communication between the service server 2 and the client PC 102 or between the service server 2 and the mobile station 106, to be used in processing executed by the client program 14.

Figure 4:
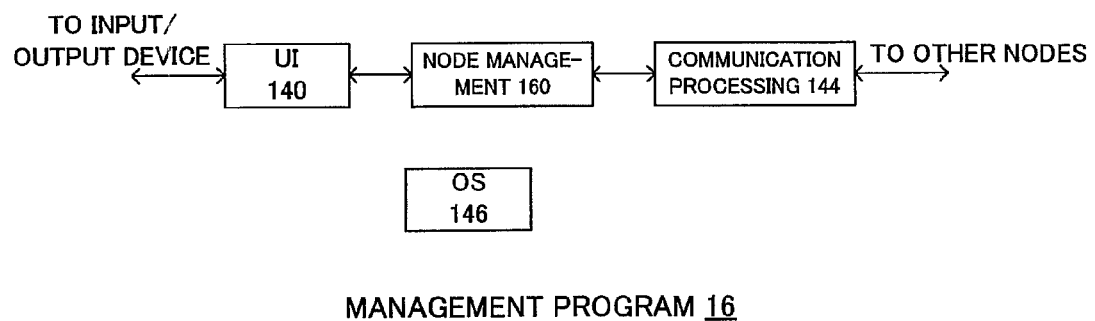
FIG. 4 is a diagram showing a management program, which is run on the management terminal shown in FIG. 1 and FIG. 2.

FIG. 4 is a diagram showing a management program 16 which is run on the management terminal 108 shown in FIG. 1 and FIG. 2.

As illustrated in FIG. 4, the client program 14 is composed of a UI module 140, a node management module 160, and a communication processing module 144. The node management module 160 receives an error message, which notifies of a processing error, from another node such as the service server 2, and manages the other node. The node management module 160 receives information indicating the occurrence of a processing error and a message related to this processing error, or information indicating the fact that a processing error has occurred, from the service server 2, and performs processing for analyzing the cause of the processing error and for solving the processing error.

Figure 5:
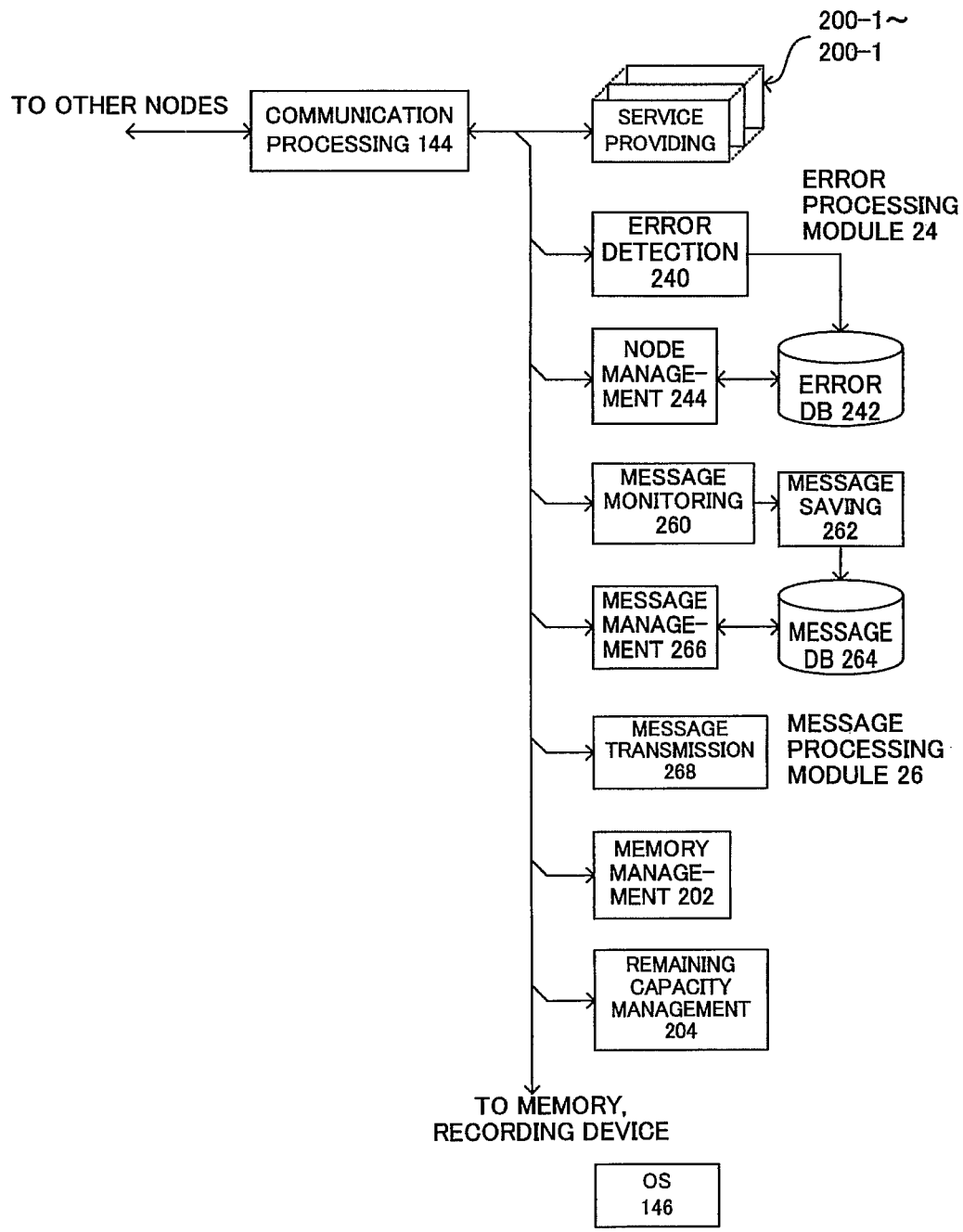
FIG. 5 is a diagram showing the configuration of a service server program which is run on a service server shown in FIG. 1 and FIG. 2.

FIG. 5 is a diagram showing the configuration of a service server program 20, which is run on the service server 2 shown in FIG. 1 and FIG. 2.

As illustrated in FIG. 5, the service server program 20 is composed of a communication processing module 144, service providing modules 200-1 to 200-n, an error processing module 24, a message processing module 26, a memory management module 202, and a remaining capacity monitoring module 204.

The processing module 24 is composed of an error detection module 240, an error database (error DB) 242, and a node management module 244. The message processing module 26 is composed of a message monitor 260, a message saving module 262, a message DB 264, a message management module 266, and a message transmission module 268.

The service server program 20 uses these components to perform the following processing (1) to (4):

(1) Processing for providing a service to the client PC 102 and the mobile station 106;

(2) Processing for detecting a processing error while providing the service and for notifying the management terminal 108 of the processing error;

(3) Processing for storing a message relevant to the processing error and for notification to the management terminal 108; and (4) Processing of freeing up a storage area allocated to the memory 124 (FIG. 2) in order to store the processing error when the remaining capacity of the memory 124 becomes small.

In the service server program 20, the service providing module 200 performs processing of exchanging messages with the client PC 102 and the mobile station 106, receiving service requests from these nodes, and providing requested services to these nodes.

Some error can happen in the service providing module 200 during the processing.

The remaining capacity monitoring module 204 monitors the storage capacity (remaining capacity) of free storage areas of the memory 124 (FIG. 2) in the service server 2 which are not allocated to any processing, and notifies the remaining capacity to the memory management module 202. The memory management module 202 allocates as the need arises storage areas of the memory 124 to the respective components of the service server program 20 in an amount necessary to the processing. The memory management module 202 frees up a storage area of the memory 124 allocated to each of components of the service server program 20 under a given condition, so that the freed up storage area can be used for processing by another component.

Figure 6:
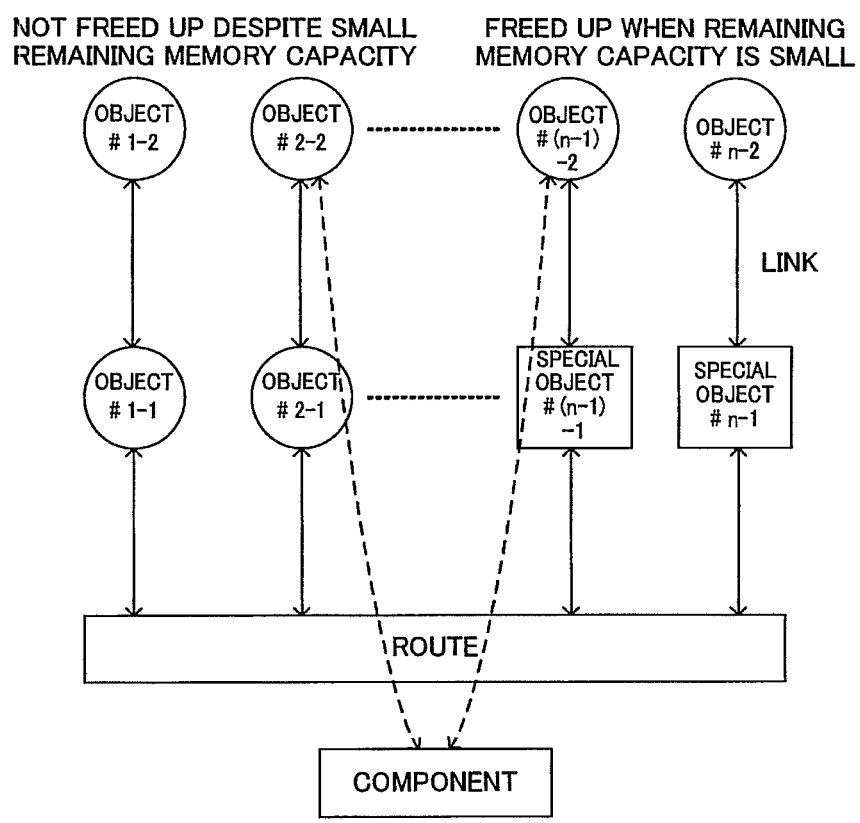
FIG. 6 is a diagram showing an example of the allocation and freeing up of a storage area of a memory (FIG. 2) in the service server by a memory management module shown in FIG. 5.

FIG. 6 is a diagram showing an example of the allocation and freeing up of a storage area of the memory 124 (FIG. 2) in the service server 2 by the memory management module 202 shown in FIG. 5.

The memory management module 202 allocates storage areas of the memory 124 to processing of the communication processing module 144, processing of the service providing module 200, processing of the error processing module 24, processing of the remaining capacity monitoring module 204, processing of the memory management module 202 itself, and other processing of the message processing module 26 than message storing.

The memory management module 202 defines storage areas that are allocated to the above processing as storage areas that are not freed up just because the remaining capacity of the memory 124 becomes smaller than a predetermined threshold. As shown in FIG. 6, the memory management module 202 manages the thus allocated storage areas as a series of general objects linked directly to a route (Objects #1-1, #1-2, #2-1, #2-2 in the example of FIG. 6), and provides the allocated storage areas for use by the processing executed by the components of the service server program 20.

The memory management module 202 also allocates a storage area of the memory 124 to the message storing processing of the message processing module 26 on a given processing unit basis, for example, on a provided service basis or on a session basis.

The memory management module 202 defines storage areas that are allocated to this processing as storage areas that can be freed up only for the reason that the remaining capacity of the memory 124 has become smaller than the predetermined threshold.

As shown in FIG. 6, the memory management module 202 manages the thus allocated storage areas as general objects (Objects #(n-1)-2, #n-2 in the example of FIG. 6) that are linked to special objects linked directly to the route (Special Objects #(n-1)-1, #n-1 in the example of FIG. 6), and provides the allocated storage areas for use by processing executed by the message processing module 26.

The special objects are also called soft reference objects.

The route mentioned above is a term in garbage collection, and means the ultimate source of reference, for example, a stack or a register.

These are actually needed to run a program, and memory areas referred to by these must not be freed up.

Through the above-described allocation and freeing up of storage areas of the memory 124 by the memory management module 202, a storage area for the message storing processing by the message processing module 26 and a storage area for other processing are set in the memory 124 as shown in FIG. 2.

As a condition for freeing up a message storing area of the memory 124, various conditions concerning the processing load on the service server 2 and the remaining memory capacity of the memory 124 can be set, for example. In the following, a case of freeing up a message storing area under a condition that the remaining capacity of the memory 124 is smaller than a predetermined value is given as a specific example for a concrete and clear description of the present invention.

As indicated by the dotted lines in FIG. 6, the components of the service server program 20 accesses storage areas managed as objects by the memory management module 202 by following the route and a series of links between the objects.

Given below as a specific example is a case in which the memory management module 202 allocates a storage area on a session basis to the message storing processing of the message processing module 26.

The error detection module 240 of the error processing module 24 detects a processing error in the service providing module 200, and stores error information which indicates specifics of the detected processing error, a session relevant to the processing error, and the like, in the error DB 242.

The node management module 244 performs processing for managing the service server 2 under the control of the management terminal 108. The node management module 244 notifies the message management module 266 and the management terminal 108 of error information stored in the error DB 242 upon request from the management terminal 108 or, for example, each time a processing error occurs, in the form of an error message.

Figure 7:
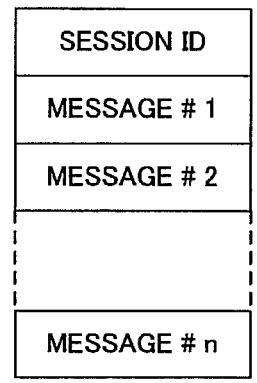
FIG. 7 is a diagram showing a message that a message saving module shown in FIG. 5 stores.

FIG. 7 is a diagram showing a message that the message saving module 262 shown in FIG. 5 stores.

The message monitor 260 of the message processing module 26 monitors messages exchanged between the service server 2 and the client PC 102 and between the service server 2 and the mobile station 106, and outputs the monitored messages to the message saving module 262.

The message saving module 262 outputs the messages input from the message monitor 260 to the message DB 264, which, as shown in FIG. 7, sorts the input messages by session and stores the sorted messages in message storing areas (FIG. 2) of the memory 124.

A message stored in a message storing area of the memory 124 loses its contents by deletion or loses its validity when the message storing area is freed up due to the remaining capacity of the memory 124 growing small.

Figure 8:
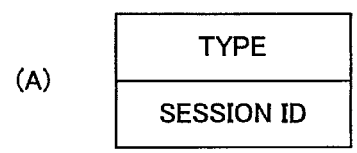
FIG. 8 are diagrams showing information that is processed by a message management module shown in FIG. 5, with FIG. 8(A) showing a service type and a session identifier which are stored in an other-data storing area (FIG. 2) and sent to the management terminal by the message management module, and FIG. 8(B) showing messages and others that are sent from the message management module to the management terminal.
Figure 8:
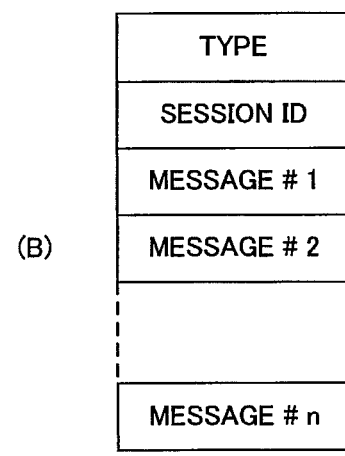

FIG. 8 is a diagram showing information that is processed by the message management module 266 shown in FIG. 5, with FIG. 8(A) showing a service type and a session identifier which are stored in the other-data storing area (FIG. 2) and sent to the management terminal 108 by the message management module 266, and FIG. 8(B) showing messages and others that are sent from the message management module 266 to the management terminal 108.

When a session through which the service providing module 200 provides a service is established between the service server 2 and another node, messages transmitted in the session are monitored, and the error detection module 240 notifies an error, the message management module 266 stores the type of the error and the identifier of the session (session identifier) in which messages are transmitted in the other-data storing area (FIG. 2) of the memory 124 as shown in FIG. 8(A).

Upon request from the management terminal 108, or, for example, each timing at which a processing error occurs, the message transmission module 268 searches for a session ID that has been stored in the manner shown in FIG. 8(A).

In the case where the message DB 264 is storing a message that is associated with a session ID obtained as a result of the search, the message transmission module 268 associates the error type and the session ID with the message transmitted in the session, and outputs them to the management terminal 108 as shown in FIG. 8(B).

In the case where the message DB 264 is storing no message that is associated with a session ID obtained as a result of the search, the message transmission module 268 outputs the error type and the session ID alone to the management terminal 108 as shown in FIG. 8(A).

Figure 9:
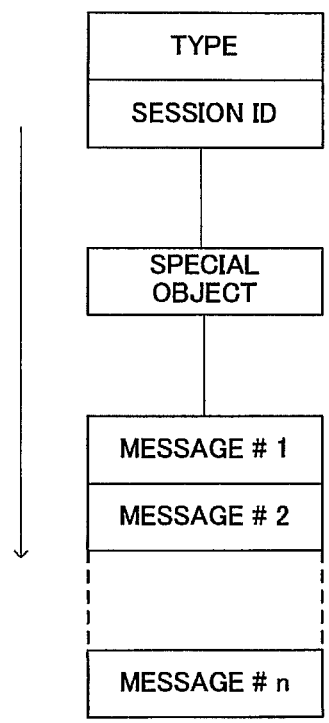
FIG. 9 is a diagram showing the relation between the service type, session, Messages #1 to #n shown in FIGS. 8(A) and 8(B) and a special object shown in FIG. 6.

FIG. 9 is a diagram showing the relation between the service type, session, and Messages #1 to #n shown in FIGS. 8(A) and 8(B) and a special object shown in FIG. 6. The service type, the session, the special object, and Messages #1 to #n are referred to in the stated order as indicated by the arrow in FIG. 9.

Messages #1 to #n shown in FIG. 8(B) are associated with Objects #(n-1)-2 and #n-2 shown in FIG. 6. The memory management module 202 frees up storage areas where Messages #1 to #n are stored solely because the remaining capacity of the memory 124 has become smaller than a predetermined threshold.

Whether or not storage areas that store Messages #1 to #n are free can be detected by accessing the special object.

A further description on the processing of the service server program 20 is given below.

Figure 10:
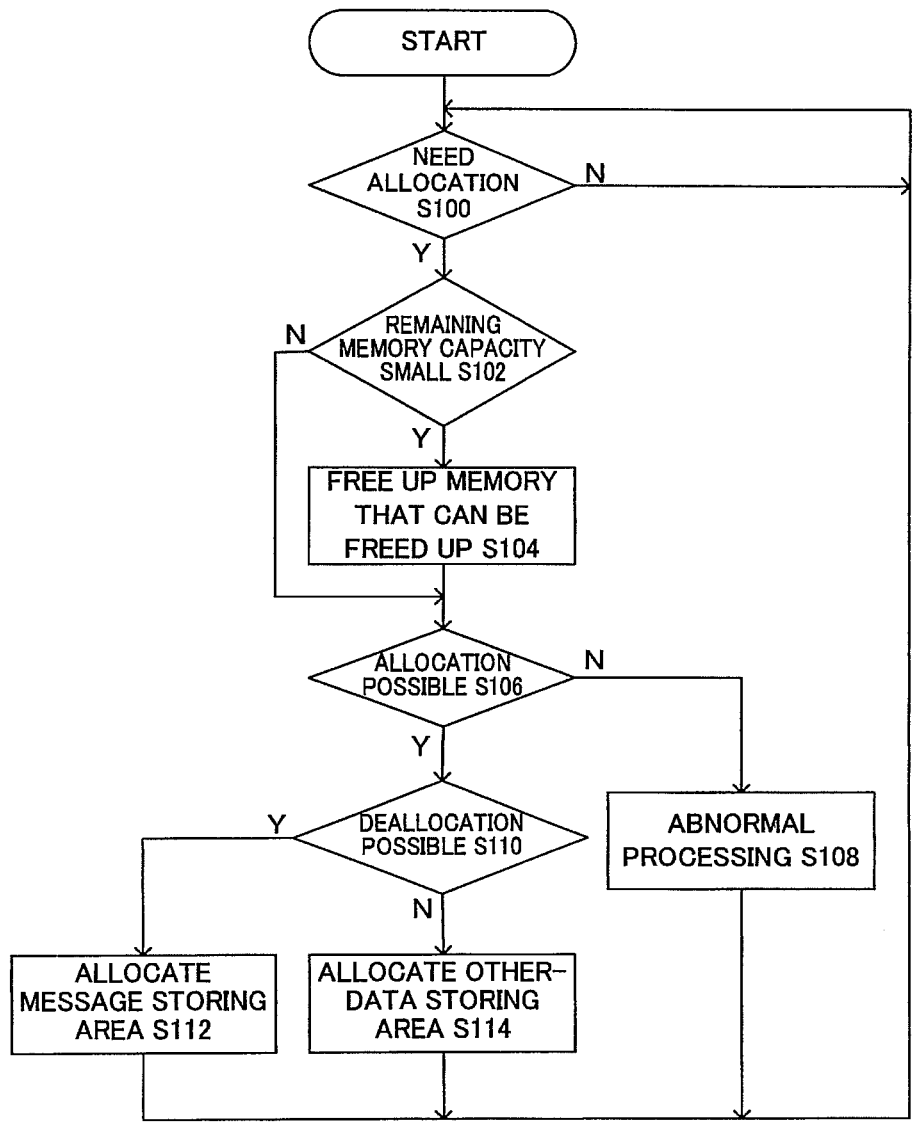
FIG. 10 is a flow chart showing processing (S10) for the allocation and freeing up of a storage area of the memory by the memory management module shown in FIG. 5.

FIG. 10 is a flow chart showing processing (S10) for the allocation and freeing up of a storage area of the memory 124 by the memory management module 202 shown in FIG. 5.

In Step 100 (S100), the memory management module 202 judges whether or not the allocation of storage areas of the memory 124 is necessary for processing of the respective components of the service server program 20.

The service server program 20 proceeds to S102 when the storage area allocation is necessary, and otherwise stays at the processing of S100.

In Step 102 (S102), the memory management module 202 judges whether or not the remaining capacity of the memory 124 which is obtained by the remaining capacity monitoring module 204 is smaller than a given threshold. The service server program 20 proceeds to S104 when the remaining capacity of the memory 124 is smaller than the threshold, and moves to S106 if not.

In Step 104 (S104), the memory management module 202 deallocates storage areas of the memory 124 that can be freed up (original message storing areas).

In Step 106 (S106), the memory management module 202 judges whether or not the remaining capacity of the memory 124 is enough for the allocation of new storage areas of the memory 124.

The service server program 20 proceeds to S108 when the remaining capacity of the memory 124 is not enough, and otherwise proceeds to S110.

In Step 108 (S108), the memory management module 202 performs abnormal processing which includes notifying a component to which a storage area is to be allocated of the fact that the storage area allocation is not possible.

In Step 110 (S110), the memory management module 202 judges whether or not the storage area to be newly allocated is the message storing area (FIG. 2), which can be freed up when the remaining capacity of the memory 124 is small.

The memory management module 202 proceeds to S112 when the storage area to be newly allocated is the message storing area, and moves to S114 if not.

In Step 112 (S112), the memory management module 202 allocates the message storing area.

In Step 114 (S114), the memory management module 202 allocates the other-data storing area (FIG. 2).

Figure 11:
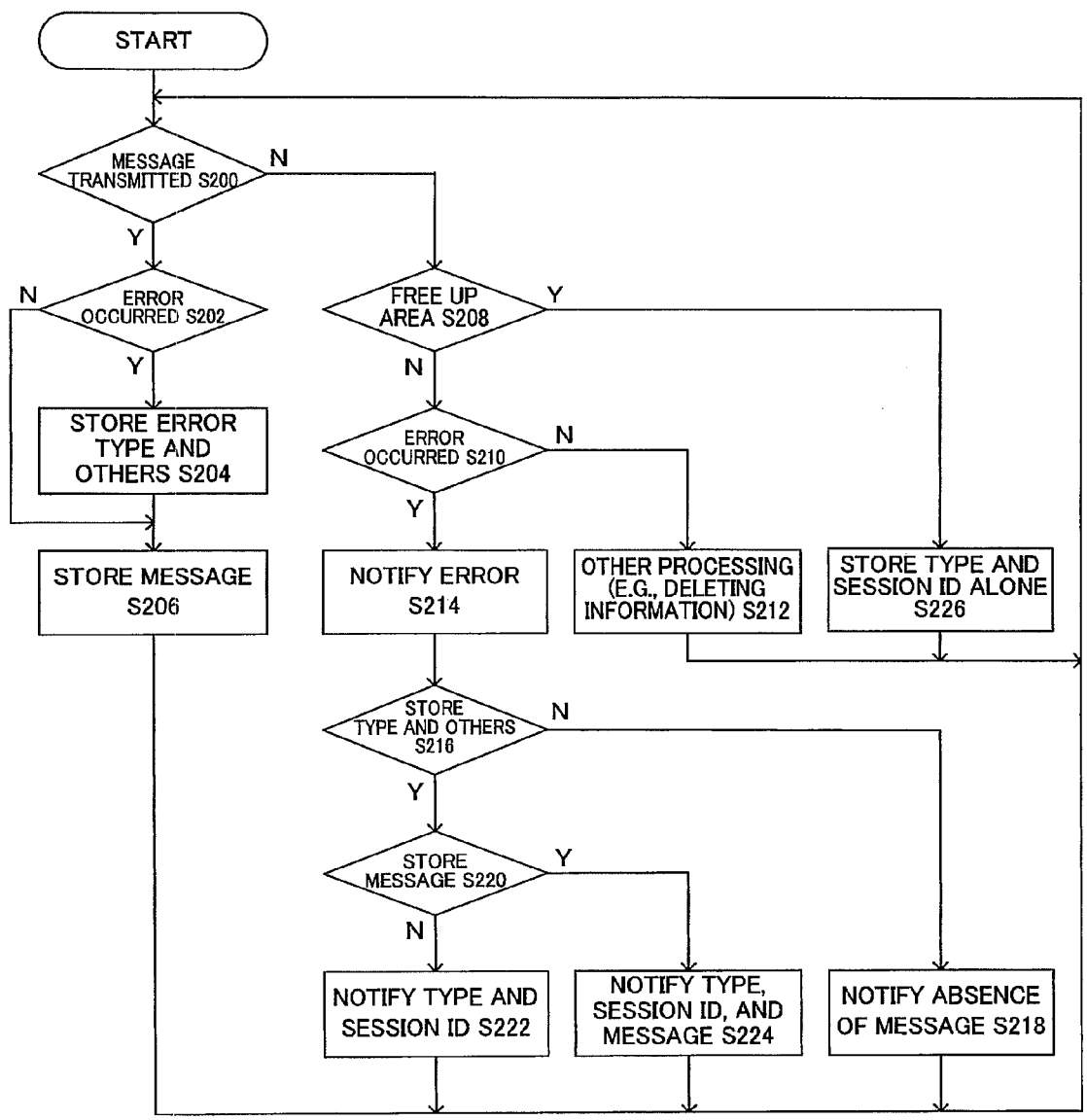
FIG. 11 is a flow chart showing processing (S20) for the transmission of an error message, a message, and the like by an error processing module and message processing module shown in FIG. 5.

FIG. 11 is a flow chart showing processing (S20) for the transmission of an error message, a message, and the like by the error processing module 24 and the message processing module 26 shown in FIG. 5.

In Step 200 (S200), the message monitor 260 judges whether or not there has been a message transmitted between the service server 2 and another node.

The service server program 20 proceeds to S202 when there has been a message, and otherwise moves to S208.

In Step 202 (S202), the error detection module 240 judges whether or not a processing error has occurred in the service providing module 200. The service server program 20 proceeds to S204 when there has been a processing error, and moves to S206 if not.

In Step 204 (S204), the node management module 244 notifies the message management module 266 of the processing error, and the message management module 266 stores the type of the error that has occurred and the ID of a session in which the processing error has occurred in the other-data storing area (FIG. 2) as shown in FIG. 8(A).

In Step 206 (S206), the message monitor 260 monitors and downloads the message that has been sent, and outputs the message to the message saving module 262. The message saving module 262 receives the message from the message monitor 260, and stores the message in the message DB 264 (the message storing area of the memory 124; FIG. 2).

In the case where the memory management module 202 frees up the message storing area (FIG. 2) in Step 208 (S208), only the error type and session ID shown in FIG. 8(A) are stored in the other-data storing area as shown in Step 226.

In the case where the memory management module 202 does not free up the message storing area, the service server program 20 proceeds to S210.

In Step 210 (S210), the node management module 244 judges whether or not a processing error has occurred in the service providing module 200. The service server program 20 proceeds to S214 when there has been a processing error, and moves to S212 if not.

In Step 212 (S212), the message management module 266 performs other processing which includes deleting the error type and session ID stored in the other-data storing area.

In Step 214 (S214), the node management module 244 notifies an error message to the management terminal 108.

In Step 216 (S216), the message transmission module 268 judges whether or not the message storing area (FIG. 2; the message DB 264) is storing an error type and a session ID that are associated with the error message notified in S214.

The service server program 20 proceeds to S220 in the case where an error type and a session ID that are associated with the error message are stored, and moves to S218 if not.

In Step 218 (S218), the message transmission module 268 notifies the management terminal 108 of the absence of a message.

In Step 220 (S220), the message transmission module 268 judges whether or not the message storing area (FIG. 2; the message DB 264) is storing a message that is associated with the error message notified in S214.

The service server program 20 proceeds to S224 in the case where a message associated with the error message is stored, and otherwise moves to S222.

In Step 222 (S222), the message transmission module 268 sends the error type and session ID stored in the other-data storing area to the management terminal 108 as shown in FIG. 8(A).

In Step 224 (S224), the message transmission module 268 sends the error type, the session ID, and the message to the management terminal 108 as shown in FIG. 8(B).

Overall Operation of the Network System 1

Messages for providing a service are transmitted between the service server 2 and the client PC 102 (FIG. 1) and between the service server 2 and the mobile station 106 (FIG. 1), and the service providing module 200 (FIG. 5) of the service server program 20 in the service server 2 performs processing necessary to provide a service. The result of processing a service is sent from the service server 2 to a node that has requested the service, and is output to a user of the node.

Messages transmitted between the service server 2 and another node are monitored by the message monitor 260 (FIG. 5) of the service server program 20 in the service server 2. The monitored messages are sorted by session and stored sequentially in a storage area of the memory 124 (FIG. 2) that is freed up when the remaining capacity of the memory 124 becomes small (the message DB 264) as shown in FIG. 7.

If a processing error occurs in the service providing module 200 (FIG. 5), the error detection module 240 detects the processing error and an error message indicating specifics of the detected error is notified to the management terminal 108 (FIG. 1). The fact that an error has occurred is notified to the message management module 266, and the type of the error that has occurred and a session ID relevant to the error are stored in a storage area that is not freed up just because the remaining capacity of the memory 124 (FIG. 2) has become small (the other-data storing area; FIG. 2).

When the management terminal 108 requests the transmission of a message, the message transmission module 268 sends the message and the like as shown in the following (1) to (3):

(1) In the case where the other-data storing area (FIG. 2) is storing an error type and a session ID and the message storing area (the message DB 264) is storing a message that is associated with the error type and the session ID, the error type, the session ID, and the associated message are sent to the management terminal 108.

(2) In the case where the other-data storing area (FIG. 2) is storing an error type and a session ID and the message storing area (the message DB 264) is not storing a message that is associated with the error type and the session ID, only the error type and the session ID are sent to the management terminal 108.

(3) In the case where the other-data storing area (FIG. 2) is not storing an error type and a session ID, a notification of the absence is sent to the management terminal 108.

```
1 . . . network system
100 . . . network
102 . . . client PC
120 . . . main body
122 . . . CPU
124 . . . memory
126 . . . input/output device
128 . . . network IF
130 . . . recording device
132 . . . recording medium
134 . . . wireless IF
104 . . . base station
106 . . . mobile station
2 . . . service server
20 . . . service server program
200 . . . service providing module
202 . . . memory management module
204 . . . remaining capacity monitoring module
24 . . . error processing module
240 . . . error detection module
242 . . . error DB
244 . . . node management module
26 . . . message processing module
260 . . . message monitor
266 . . . message management module
268 . . . message transmission module
```

INDUSTRIAL APPLICABILITY

The present invention can be applied to processing of messages transmitted between communication nodes.

The invention claimed is:

1. A message processing device, comprising:
a first processing means which performs first processing of storing a transmitted message in a first storage area allocated to a memory;
a second processing means which performs second processing using both or one of the first storage area of the memory and a second storage area of the memory, the second processing being other processing than the first processing, the second storage area being other areas than the first storage area;
a remaining capacity monitoring means, executed by a computer system, which monitors a remaining capacity of the memory, the remaining capacity being what is left after excluding the first storage area and the second storage area;
a freeing up means which deallocates the first storage area from the memory depending on the remaining capacity of the memory; and
a message outputting means which outputs, in response to a request, the message stored in the first storage area of the memory.

2. A message processing device according to claim 1, further comprising an error detecting means which detects at least an error that occurs in the second processing,
wherein the message outputting means outputs a message relevant to the detected error.

3. A message processing device according to claim 2, wherein the freeing up means deallocates the first storage area from the memory when the remaining capacity of the memory is equal to or smaller than a given amount.

4. A message processing device according to claim 3,
wherein, when the first storage area is allocated to the memory and the allocated first storage area is storing a message, the message outputting means outputs at least the stored message, and
wherein, when the first storage area allocated to the memory is freed up and a message has been stored in the freed up first storage area, the message outputting means outputs at least first information indicating the fact that a message has been stored.

5. A message processing device according to claim 4, wherein, when the first storage area is allocated to the memory and the allocated first storage area is storing a message, the message outputting means outputs the stored message and the first information.

6. A message processing device according to claim 5,
wherein the second processing includes third processing that the message processing device is requested to perform by an external device, and
wherein a message transmitted between the external device and the message processing device is data that is used for the third processing.

7. A message processing system comprising a first node and a second node between which a message is transmitted,
wherein the second node includes:
a first processing means which performs first processing in which the message transmitted between the first node and the second node is stored in a first storage area allocated to a memory;
a second processing means which performs second processing using both or one of the first storage area of the memory and a second storage area of the memory, the second processing being other processing than the first processing, the second storage area being other areas than the first storage area;
a remaining capacity monitoring means, executed by a computer system, which monitors a remaining capacity of the memory, the remaining capacity being what is left after excluding the first storage area and the second storage area;
a freeing up means which deallocates the first storage area from the memory depending on the remaining capacity of the memory; and
a message outputting means which outputs, in response to a request, the message stored in the first storage area of the memory.

8. A message processing device according to claim 7,
wherein the second processing includes third processing that the second node is requested to perform by the first node, and wherein a message transmitted between the first node and the second node is data that is used for the third processing.

9. A message processing system according to claim 8, further comprising a third node which processes the output message, wherein the message outputting means of the second node outputs the stored message to the third node.

10. A message processing method, comprising:
- a first processing step, executed by a computer, which performs first processing of storing a transmitted message in a first storage area allocated to a memory;
- a second processing step which performs second processing using both or one of the first storage area of the memory and a second storage area of the memory, the second processing being other processing than the first processing, the second storage area being other areas than the first storage area;
- a remaining capacity monitoring step which monitors a remaining capacity of the memory, the remaining capacity being what is left after excluding the first storage area and the second storage area;
- a freeing up step which deallocates the first storage area from the memory depending on the remaining capacity of the memory; and
- a message outputting step which outputs, in response to a request, the message stored in the first storage area of the memory.

11. A program stored on a computer, wherein the computer executes the program which causes the computer to perform:
- a first processing step which performs first processing of storing a transmitted message in a first storage area allocated to a memory;
- a second processing step which performs second processing using both or one of the first storage area of the memory and a second storage area of the memory, the second processing being other processing than the first processing, the second storage area being other areas than the first storage area;
- a remaining capacity monitoring step which monitors a remaining capacity of the memory, the remaining capacity being what is left after excluding the first storage area and the second storage area;
- a freeing up step which deallocates the first storage area from the memory depending on the remaining capacity of the memory; and
- a message outputting step which outputs, in response to a request, the message stored in the first storage area of the memory.

* * * * *

UNITED STATES PATENT AND TRADEMARK OFFICE
CERTIFICATE OF CORRECTION

| | |
|---|---|
| PATENT NO. | : 8,880,963 B2 |
| APPLICATION NO. | : 12/065664 |
| DATED | : November 4, 2014 |
| INVENTOR(S) | : Hideaki Nobata et al. |

Page 1 of 1

It is certified that error appears in the above-identified patent and that said Letters Patent is hereby corrected as shown below:

In the Claims

In column 12, line 64, in Claim 8, delete "device" and insert -- system --, therefor.

Signed and Sealed this
Eighth Day of September, 2015

Michelle K. Lee
*Director of the United States Patent and Trademark Office*